United States Patent [19]
Bessette

[11] 3,800,608
[45] Apr. 2, 1974

[54] VARIABLE DIAMETER V-BELT PULLEY ASSEMBLY

[76] Inventor: Georges Henri Bessette, 209, Boulevard du Seminaire, St-Jean D'Iberville, Quebec, Canada

[22] Filed: Oct. 13, 1972

[21] Appl. No.: 297,328

[52] U.S. Cl. .......................... 74/230.17 E
[51] Int. Cl. ............................. F16h 55/52
[58] Field of Search ........... 74/230.17 E, 230.17 A, 74/230.17 R, 230.17 M; 192/105 C, 93 R, 93 A, 99 S, 99 A

[56] References Cited
UNITED STATES PATENTS

| 3,608,386 | 9/1971 | Pambed | 192/93 A |
| 3,616,706 | 11/1971 | Shimanoto | 74/230.17 M |
| 3,161,071 | 12/1964 | Getz | 74/230.17 M |
| 3,722,308 | 3/1973 | Steuer | 74/230.17 M |

FOREIGN PATENTS OR APPLICATIONS

| 117,244 | 4/1930 | Germany | 74/230.17 M |

Primary Examiner—Charles J. Myhre
Assistant Examiner—R. H. Lazarus

[57] ABSTRACT

The invention is an improved V-belt pulley assembly of the variable diameter type wherein one pulley cheek is fixed to a rotary shaft while the other is freely mounted thereon for sliding translation and relative rotation with respect to the shaft. Pressure applied on the V-belt in the pulley groove is controlled by three arms fixed to the free cheek. Each arm has a pad applied on a straight caming surface of a corresponding cam lever mounted on the shaft for pivotal movement about an axis normal to the axis of the shaft. The caming surfaces of the cam levers are inclined upwardly with respect to the axis of the shaft and in the direction of the second cheek. Centrifugal masses or lugs or a spring-pressed ring apply a controlling force on the cam levers such that the caming surfaces pivot toward the vertical between high and low speeds of the pulley and shaft thereby applying greater pressure against the belt at low speed then at high speed.

6 Claims, 8 Drawing Figures

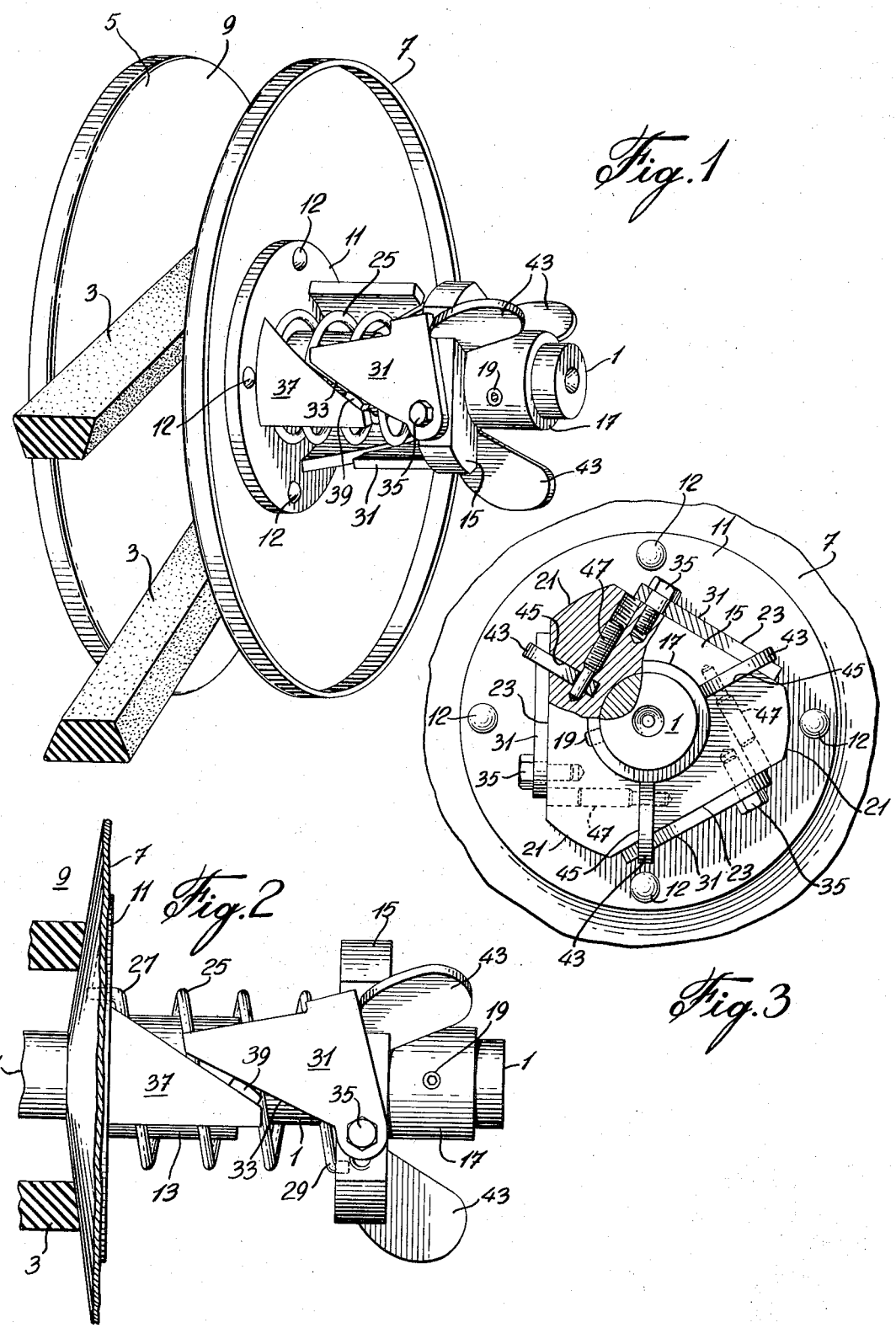

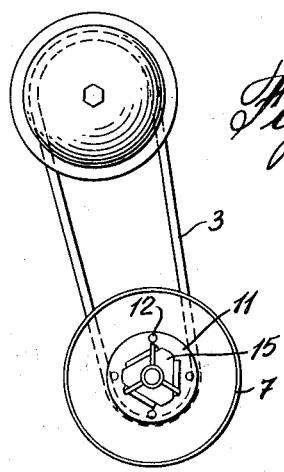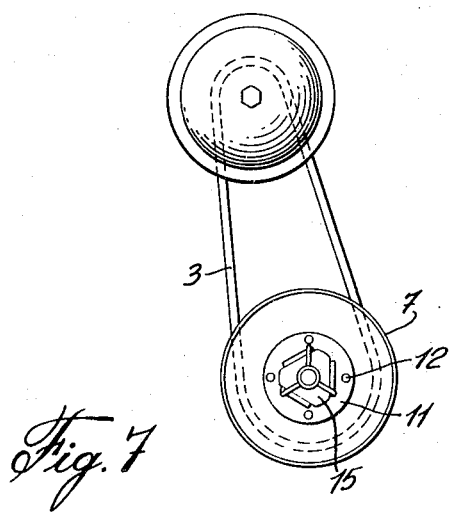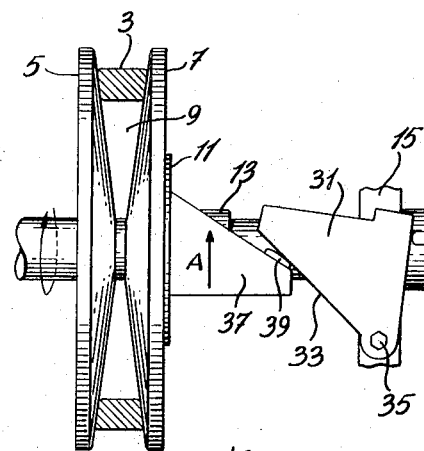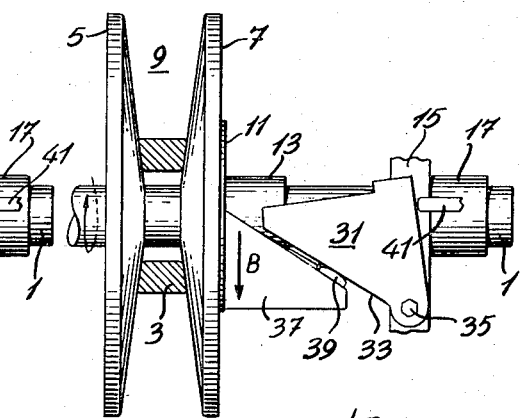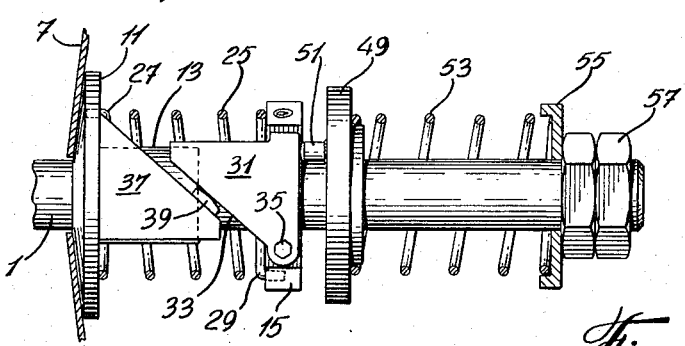

VARIABLE DIAMETER V-BELT PULLEY ASSEMBLY

The present invention relates to power transmission and more specifically to a variable diameter V-belt pulley assembly for transmitting power.

The pulley assembly is of the type wherein a first pulley cheek is fixed to a rotary shaft while a second one is freely mounted thereon for sliding translation and relative rotation with respect to the shaft whereby the belt may move in the groove defined by the cheeks to suit operating conditions. Rotation of the second cheek is obtained by a coil spring around the shaft, one end of the spring being secured to the shaft and the other end being secured to the other cheek. In this type of pulley, it should be understood that whenever there is a change in the speed of the shaft, the cheeks rotate relative to one another causing axial displacement of the second cheek permitting the belt to move to a new position corresponding to the new speed. Control of this axial movement is realized by means of a series of axial arms secured to and around the shaft in the direction of the second cheek; each arm having a pressure pad applied against the caming surface of one of a series of cam levers, equal in number to that of the arms. The caming surfaces are inclined with respect to the axis of the shaft. As the speed of the shaft changes, the pressure pads take on a new position on the caming surfaces corresponding to the new speed of the shaft. With such an arrangement, however, I have found that the pressure applied on the belt is unfavorably controlled in that it is smaller when the belt is at the periphery of the pulley groove at a location where the speed is minimum and the load being transmitted is maximum, then at the center of the groove where the reverse is true. The major disadvantages of this drawback is slippage of the belt at low speed causing overheating and decrease in efficiency of the transmission while unwarranted pressure is applied on the belt at high speed.

I have found that this drawback can be overcome by a proper control of the spring pressure such that the spring is allowed to expand more freely when the belt is at the groove periphery thereby applying more pressure and is restricted to do so when the belt is at the groove center, thereby relaxing the pressure.

More specifically, the pulley assembly of the invention provides at least one cam lever having a caming surface, said cam lever being mounted at one end for rotation with the shaft and pivotal movement about an axis normal to the axis of the shaft; at least one arm fixedly secured to the second cheek to extend in the direction of the cam lever so that a portion of the arm may contact the caming surface to ride thereon, and means resiliently pressing the lever against the arm portion to control the pushing action of the coil spring on the second cheek whereby, upon a change occurring in the load being transmitted and resulting in relative rotation of the cheeks, the arm causes the cam lever to pivot thus to adjust the distance between the cheeks to allow a belt in the belt groove to reach a new position therein corresponding to the new load. Preferably, the caming surface is a straight surface which is inclined upwardly in respect of the axis of the shaft and in the direction toward the second cheek, the assembly being constructed so that the resilient means applies a controlling force on the cam lever such that the caming surface pivots toward the vertical between high and low speeds of the pulley and shaft thereby applying greater pressure against the belt in the belt groove at low speed then at high speed whereas the reverse is true in the case of a change between low and high speeds of the pulley and shaft.

The invention will besides be better understood from the description that follows of a specific embodiment having reference to the appended drawings wherein:

FIG. 1 is a perspective view of a pulley assembly made according to the invention;

FIG. 2 is a partial side elevation view of the assembly of FIG. 1;

FIG. 3 is a cross-sectional view taken along line 3—3 of FIG. 2;

FIGS. 4 and 5 are side elevation diagrammatic views of the assembly respectively at low and speeds, intended to illustrate the operating principle of the cam levers and arms;

FIGS. 6 and 7 are side elevation views of a transmission involving a driven pulley assembly respectively in high and low speeds, the driven assembly being connected to driving means;

FIG. 8 is a side elevation view of an assembly according to the invention showing a resilient means of a different design being used to bias the cam levers.

The pulley assembly now to be described is a driven one to be mounted on a rotary shaft 1. The pulley, driven by a V-belt 3, is formed of a pair of side cheeks 5 and 7 having substantially frustoconical surfaces facing one another to define a circular groove 9 for the belt 3. The cheek 5 is fixedly mounted on the shaft 1 to rotate therewith and to be held against axial displacement. The cheek 7, however, is freely mounted on the shaft 1 so that it can rotate and move in translation independently of the shaft 1. Its center is reinforced by a ring plate 11 fixed thereto in any known manner as by rivets 2. Axially extending from and coaxial with the plate 11, to which it is secured, is a sleeve 13 into which the shaft 1 journals. Away from the cheek 7 is a collar 15 having a central sleeve 17 mounted on the shaft 1 and secured thereon in any known manner, as by holding studs 19. As clearly shown in FIG. 3, the periphery of the collar 15 defines an equilateral triangle having rounded apices 21 joining the straight sides 23. A coil spring 25, mounted around the shaft 1, has one end 27 (FIG. 2) fixed to the cheek 7 and the other end 29 fixed to the shaft 1 by being secured to the collar 15 solid with the shaft 1. Thus, the spring 25 biasses the cheek 7 toward the cheek 5 and it is this bias pressure that the present invention intends to appropriately control.

For this purpose, three cam levers 31 having a caming surface 33 are mounted at one end 35 on the collar 15 for pivotal movement about an axis normal (FIG. 3), in space, to the axis of the shaft 1. The pivots 35 may be in the form of screws threaded into suitable apertures in the sides 23 of the collar 15. The cam levers 31 themselves are flat generally triangular plates applied flatly against the straight sides 23 of the collar 15.

The cam levers 31 are intended to cooperate, through their preferably straight caming surfaces 33, with three arms 37 which, like the levers 31, are equally distributed around the shaft 1. These arms 37 are fixedly secured, as by welding or otherwise, by one edge on the ring plate 11 of the cheek 7 so as to project therefrom in the direction of the cam levers 31. Although the arms 37 are shown as triangular in outline, this is only to provide a wide base for connecting to the ring plate 11. It will be understood that such arms could be simple straight bars and are here used only to provide portions thereof to come in contact with and ride on the caming surfaces 33, such as through pads 39 acting as bearing tips.

Means 41 (shown schematically in FIGS. 4 and 5) is provided to resiliently press the levers 31 against the pads 39 of the arms 37 and thus assume, in conjunction with the caming surfaces 33, a controlling effect on the axial movement of the cheek 7. This pressing means 41, in FIGS. 1, 2, and 3, is in the form of three centrifugal masses 43, one corresponding to each cam lever 31, extending radially of the shaft 1 and are pivotable about axes normal, in space, to the axis of the shaft 1 (FIG. 3). Each mass 43 has a lobe-like flat shape and is edgedly applied against one side of the corresponding cam lever 31. In FIGS. 1, 2, and 3, the masses 43 are edgedly inserted in radial slots 45 and made pivotable by means of studs 47 having smooth cylindrical insertable through mating holes of the masses 43. It will now be appreciated that as the shaft 1 accelerates clockwise, the masses 43 rotate counterclockwise under centrifugal action.

From the drawings, it will also be gathered that the caming surfaces 33 of the levers 31 are inclined with respect to the shaft 1 in the direction of the cheek 7.

The operation of the assembly is as follows, it being remembered that in the particular embodiment disclosed the pulley 5, 7 and the shaft 1 are driven by the V-belt 3 and connected to the caterpillar of a snowmobile.

The assembly is designed so that the belt 3 may move between the peripheral position of FIG. 4, for low speed and maximum load transmission, and the center position of FIG. 5, for high speed and minimum load transmission. Let us now assume that the snowmobile after running on a flat surface is coming to a steep incline. As the snowmobile moves into the incline, the rotary speed of the shaft 1 and, consequently, of the cheek 5 decreases while that of the driving belt 3 and, consequently, of the cheek 7, remains momentarily constant. Because of the upward incline, the load on the motor is increased and an additional torque must be transmitted to the shaft 1 and the snowmobile caterpillar. At that very moment, the cheek 7 rotates faster than the cheek 5, as indicated by the arrow A and the arms 37 force the cam levers 31 in counterclockwise rotation against the bias of the pressing means 41 while climbing on the caming surface 33. This movement is helped in the case where the pressing means 41 is made up of the centrifugal masses 43 since the latter will rotate clockwise under a diminishing centrifugal force resulting from the decelerating shaft 1. The belt then moves toward the periphery of the pulley under the action of the spring 25 for lower speed and greater torque. From a study of FIG. 4, it will be noted that the camming surfaces 33 have moved vertically (compared with FIG. 5) so that the cam levers 31 offer less resistance to the leftward shifting of the cheek 7 and the belt 3 is therefore subjected to a higher clamping pressure from the cheeks 5 and 7 which is what is precisely desired since a greater torque is being transmitted.

Should, however, the snowmobile move down a steep incline, the shaft and the cheek 5 will rotate faster causing the cheek 7 to retard (arrow B of FIG. 5), masses 43 will rotate clockwise bearing on the cam levers 31 with greater force and allowing them to pivot counterclockwise so that the pads 39 of the arms 37 move down the caming surfaces 33. The belt 3 will then move toward the groove 9 for greater speed and lower torque transmission. This situation will be somewhat similar to that of FIG. 5 and it will be appreciated that, the caming surfaces 33 having moved toward the horizontal, the cam levers 31 in conjunction with the pressing means 41 will have a restraining effect on the spring 25 thus decreasing the clamping pressure on the belt 3 which is what is precisely desired since a smaller torque is being transmitted.

It will thus be appreciated that I have provided a pulley assembly allowing a more appropriate control over the pressure applied on the driving belt by the pulley cheeks so that the said pressure is greater at low speed high torque transmission of the pulley, when needed, and smaller at high speed low torque transmission, when less required.

In the variant illustrated in FIG. 8, the pressing means comprises a pressure ring 49 slidably mounted on the shaft 1. It has, one one face, three lugs 51 each bearing on one edge of one cam lever 31 to cause the latter to pivot counterclockwise under the action of a coil spring 53 bearing against the other face of the ring 49 and against a flanged annulus 55 held by a pair of locking nuts 57 screwed on the shaft 1. It will be gathered that the action of this pressing means is similar to that of the centrifugal masses.

I claim:

1. A variable diameter V-belt pulley assembly for power transmission, said assembly being of the type including a pair of side cheeks defining therebetween a circular groove, a first one of said cheeks being fixedly mounted on a rotary shaft while a second one is mounted over said shaft for free rotation relative thereto and axial translation movement thereon whereby it may move relative to the first cheek, the improvement in the combination with said assembly comprising:

a. a coil spring around said shaft having one end fixed to said second cheek and the other end fixed to said shaft in driving interengagement and for pushing said second cheek toward said first cheek;

b. at least one cam lever having a caming surface, said cam lever being mounted at one end for rotation with said shaft and pivotal movement about an axis normal to the axis of said shaft;

c. at least one arm fixedly secured to said second cheek to extend in the direction of said cam lever so that a portion of said arm contact said caming surface to ride thereon, and d. means pressing said lever against said arm portion to control the pushing action of said coil spring on said second cheek whereby, upon a change in the load being transmitted resulting in relative rotation of said cheeks, said arm causes said cam lever to pivot thus to adjust the distance between said cheeks and to allow a belt in said belt groove to reach a new position therein corresponding to the new load.

2. An assembly as claimed in claim 1 wherein said caming surface is a straight surface inclined upwardly with respect to the axis of said shaft and in the direction of said second cheek, constructed so that said pressing means applies a controlling force on said cam lever such that said caming surface pivots toward the vertical between high and low driven speeds of said pulley and shaft thereby applying greater pressure against a belt in said belt groove at said low speed then at said high speed, and vice versa.

3. An assembly as claimed in claim 2, wherein there are three cam levers and three arms corresponding respectively to said cam levers, said cam levers and arms being spread around said shaft.

4. An assembly as claimed in claim 3, wherein each cam lever is a flat element of which two edges thereof form an angle with the pivot point being located at the apex of said angle, the bias of said pressing means being applied against a first one of said two edges and said caming surface being constituted by a second one of said two edges.

5. An assembly as claimed in claim 4, wherein said pressing means is formed of three centrifugal masses extending radially of said shaft and pivotable about axes normal to the axis of said shaft, each mass being located around said shaft and applied against said first one of said two edges of said cam levers.

6. An assembly as claimed in claim 4 wherein said pressing means comprises a pressure ring slidably mounted on said shaft on the side of said cam levers away from said second cheek, a resilient means biassing said pressure ring toward said cam levers, and three lugs on said ring each applied against the first ones of said edges of said cam levers.

* * * * *